(12) United States Patent
Suda et al.

(10) Patent No.: US 6,390,656 B1
(45) Date of Patent: May 21, 2002

(54) HEADLIGHT FOR MOTORCYCLE

(75) Inventors: Toshihiko Suda; Shigeru Kodaira; Koichi Hikichi, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/628,651

(22) Filed: Jul. 28, 2000

(30) Foreign Application Priority Data

Jul. 30, 1999 (JP) .......................................... 11-216752

(51) Int. Cl.$^7$ .............................................. F21V 33/00
(52) U.S. Cl. ........................ 362/475; 362/473; 362/474
(58) Field of Search ................................ 362/475, 518, 362/543, 544, 247, 346, 473, 474

(56) References Cited

U.S. PATENT DOCUMENTS

| | | | |
|---|---|---|---|
| 4,503,488 A | * 3/1985 | Soules et al. ................. | 362/80 |
| 5,140,504 A | * 8/1992 | Sato ............................ | 362/61 |
| 5,727,864 A | * 3/1998 | Stelling et al. ............... | 362/72 |
| 6,109,773 A | * 8/2000 | Nace .......................... | 362/548 |

FOREIGN PATENT DOCUMENTS

JP          A04092731          3/1992

* cited by examiner

*Primary Examiner*—Sandra O'Shea
*Assistant Examiner*—Jacob Y. Choi
(74) *Attorney, Agent, or Firm*—Birch, Stewart, Kolasch & Birch, LLP

(57) ABSTRACT

A headlight includes a low-beam lamp arranged on a longitudinally extending center line of a vehicle body and left and right high-beam lamps arranged on the opposite sides of the low-beam lamp as viewed in plan. This arrangement permits the total reflection area of the reflecting portions of the left and right high-beam lamps can be increased. The lens of the low-beam lamp and the left and right high-beam lamps is integrally formed and largely curved toward the front side of the vehicle body, thereby suppressing an increase in the air resistance by the headlight. Accordingly, the brightness of the headlight can be increased without changing the rated powers of the bulbs of the low-beam lamp and the high-beam lamps. Further, by symmetrically arranging the left and right high-beam lamps with respect to the low-beam lamp, the illumination condition on the road surface by the high beam in the case of cornering to the left can be made similar to that in the case of cornering to the right.

27 Claims, 7 Drawing Sheets

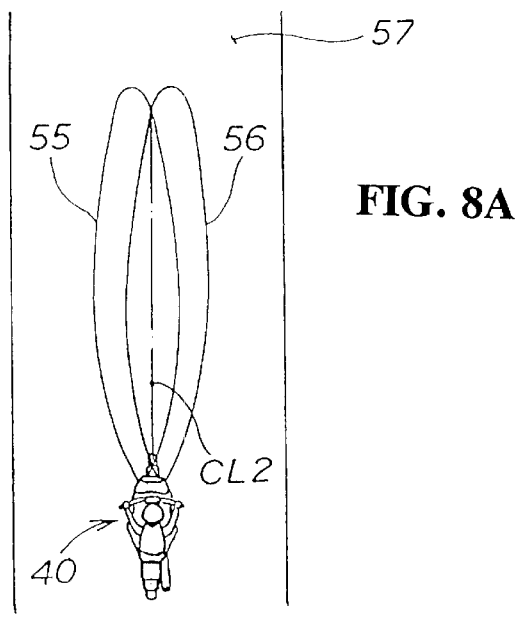
FIG. 8A
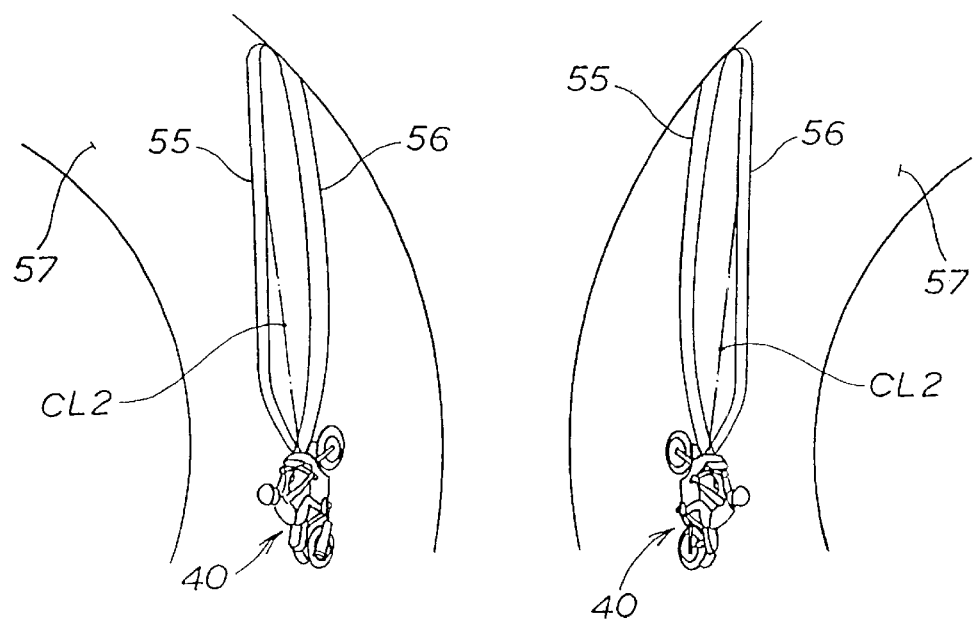
FIG. 8B  FIG. 8C

HEADLIGHT FOR MOTORCYCLE

BACKGROUND OF THE INVENTION

1. Field of the Invention

The present invention relates to a headlight for a motorcycle suitably designed for increasing the brightness.

2. Description of Background Art

A conventional headlight for a motorcycle is known, for example, from Japanese Patent Laid-open No. 4-92731 entitled "Headlight Unit for Motorcycle."

FIG. 2 of this publication shows a headlight unit 10 including a lamp 13 for high beam and a projector lamp 14 for low beam laterally arranged close to each other on the opposite sides with respect to the longitudinally extending center line of a vehicle body. The lamp 13 includes a parabolic reflecting mirror 15a and a halogen bulb 16, and the projector lamp 14 includes an elliptic reflecting mirror 19a and a halogen bulb 20.

It is considered that the brightness of the headlight unit 10 can be improved, for example, by increasing the area of the parabolic reflecting mirror 15a of the lamp 13 or the elliptic reflecting mirror 19a of the projector lamp 14.

However, an increase in the reflection area of the parabolic reflecting mirror 15a or the elliptic reflecting mirror 19a results in an increase in the area of the front surface of the headlight unit 10, causing an increase in air resistance during running.

As another method for improving the brightness of the headlight unit 10, it is considered to increase the rated power of the halogen bulb 16 or 20. However, an increase in the rated power causes an increase in power consumption, so that it is necessary to increase the capacity of a power supply system for supplying power to the headlight unit 10, causing a cost increase.

Further, since the lamp 13 for the high beam and the projector lamp 14 for the low beam are arranged laterally on the opposite sides with respect to the longitudinally extending center line of the vehicle body, there occurs a problem in the cornering of the motorcycle. That is, when the vehicle body is inclined in the cornering of the motorcycle, the height of the lamp 13 from a road surface in the case of cornering to the left is different from that in the case of cornering to the right, causing a difference in illumination condition on the road surface by the lamp 13 between these cases. This problem occurs also on the projector lamp 14.

SUMMARY AND OBJECTS OF THE INVENTION

It is accordingly an object of the present invention to provide a headlight for a motorcycle which can increase the brightness without changing the rated power as maintaining aerodynamic characteristics and can illuminate the road surface under substantially the same condition both in the case of cornering to the left and in the case of cornering to the right.

In accordance with the present invention, there is provided a headlight arranged at a front portion of a vehicle body of a motorcycle, comprising a low-beam lamp arranged on a longitudinally extending center line of said vehicle body and left and right high-beam lamps arranged on the opposite sides of said low-beam lamp as viewed in plan.

The low-beam lamp arranged on the longitudinally extending center line of the vehicle body is turned on when meeting another vehicle, whereas the left and right high-beam lamps are turned on no traffic is approaching.

Since the left and right high-beam lamps are arranged on the opposite sides of the low-beam lamp, the total reflection area of reflecting mirrors of the left and right high-beam lamps can be increased. Preferably, the lens of the low-beam lamp and the left and right high-beam lamps is integrally formed and largely curved toward the front side of the vehicle body, so that the shape of the lens can be made nearly streamlined. Accordingly, although the area of the front surface of the headlight is large, an increase in the air resistance can be suppressed.

As a result, the brightness of the headlight can be increased without changing the rated powers of the bulbs of the low-beam lamp and the high-beam lamps.

Additionally, by symmetrically arranging the left and right high-beam lamps with respect to the low-beam lamp so as to be equally spaced therefrom, the illumination condition on the road surface by the high beam in the case of cornering to the left with the vehicle body inclined to the left can be made similar to that in the case of cornering to the right with the vehicle body inclined to the right.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 8(a) to 8(c) are plan views for illustrating a second operation of the headlight according to the present invention.

DETAILED DESCRIPTION OF THE PREFERRED EMBODIMENTS

Figure 1:
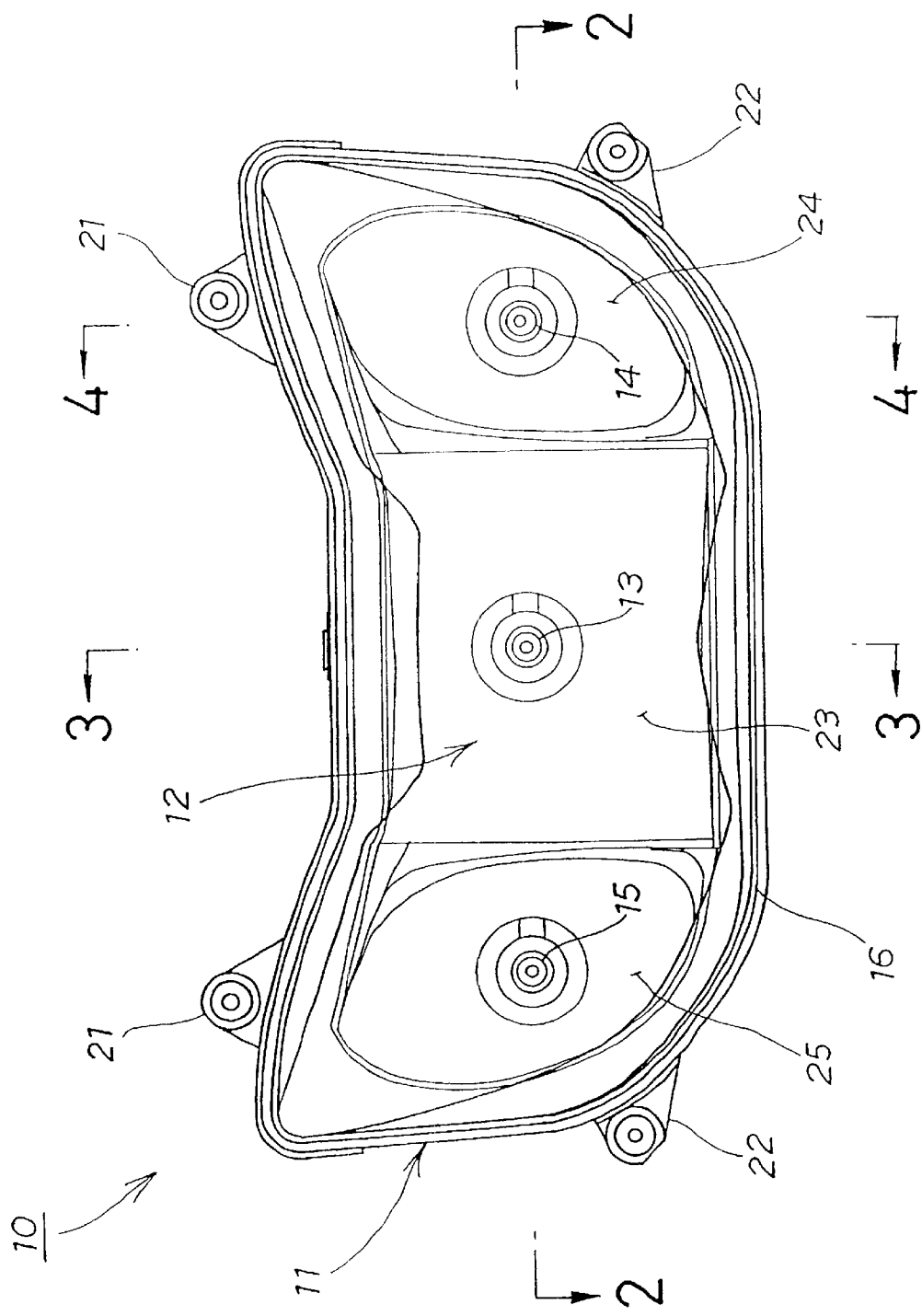
FIG. 1 is a front elevation of a headlight for a motorcycle according to the present invention.

A preferred embodiment of the present invention will now be described with reference to the attached drawings. Each drawing is to be viewed in the same orientation as that of reference numerals shown therein. Further, the terms of "left" and "right" used in this specification are meant with respect to a rider on a motorcycle.

FIG. 1 is a front elevation of a headlight 10 for a motorcycle according to the present invention. The headlight 10 includes a housing 11, a reflector 12 mounted in the housing 11, a low-beam bulb 13 mounted on the reflector 12, left and right high-beam bulbs 14 and 15 mounted on the reflector 12, and a lens 16 mounted on a front portion of the housing 11.

The housing 11 has two upper mounting portions 21 and two side mounting portions 22 adapted to be mounted on a cowling to be hereinafter described.

The reflector 12 is an integrally molded member composed of a low-beam reflecting portion 23 as a parabolic mirror for reflecting light emitted from the low-beam bulb 13 and left and right high-beam reflecting portions 24 and 25 as parabolic mirrors for reflecting light emitted from the high-beam bulbs 14 and 15, respectively.

Figure 2:
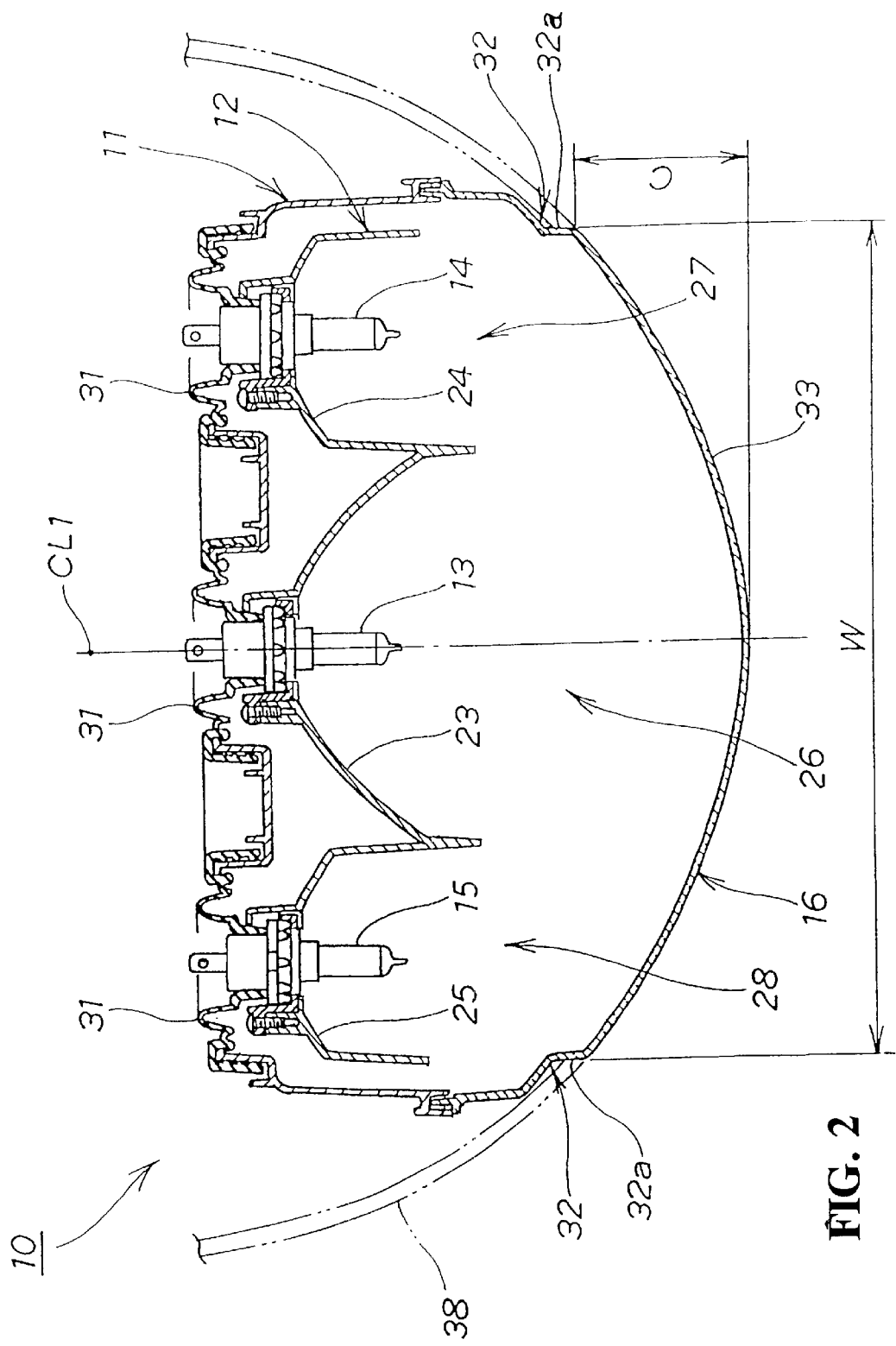
FIG. 2 is a cross section taken along the line 2—2 in FIG. 1.

FIG. 2 is a cross section taken along the line 2—2 in FIG. 1.

The housing 11, the low-beam bulb 13, the lens 16, and the low-beam reflecting portion 23 constitute a low-beam lamp 26.

The housing 11, the left high-beam bulb 14, the lens 16, and the left high-beam reflecting portion 24 constitute a left high-beam lamp 27.

The housing 11, the right high-beam bulb 15, the lens 16, and the right high-beam reflecting portion 25 constitute a right high-beam lamp 28.

A plurality of rubber caps 31 are provided for sealing the housing 11 so as to prevent the entry of rainwater or the like from mounting portions of the bulbs 13, 14, and 15. A longitudinally extending center line CL1 of the headlight 10 is provided that provides a reference axis of the low-beam bulb 13. The headlight 10 is mounted in such a manner that the center line CL1 coincides with a longitudinally extending center line of a vehicle body to be hereinafter described.

Thus, the headlight 10 arranged at a front portion of a vehicle body of a motorcycle includes the low-beam lamp 26 arranged on the longitudinally extending center line of the vehicle body and the left and right high-beam lamps 27 and 28 arranged on the opposite sides of the low-beam lamp 26 as viewed in plan.

The lens 16 is formed with stepped portions 32 each having a side surface 32a. The side surfaces 32a of the stepped portions 32 are fitted with an opening portion of a cowling 38 forming a part of the vehicle body. Accordingly, even in the case that the light emitted from the bulbs 13, 14, and 15 is passed through a portion of the lens 16 outside of the side surfaces 32a, the light is blocked by the cowling 38 and does not project from the headlight 10.

The lens 16 has a curved front surface extending between the side surfaces 32a. This curved front surface is formed as an effective lens surface 33 for transmitting the light. Letting W denote the effective lens width as the width of the effective lens surface 33 and C denote the curvature height as the distance from the front end of each side surface 32a to the top of the effective lens surface 33, $C/W \geq 0.2$.

By setting the relation between the effective lens width W and the curvature height C of the lens 16 so as to satisfy $C/W \geq 0.2$, the shape of the lens 16 can be made nearly streamlined in combination with the cowling 38.

Figure 3:
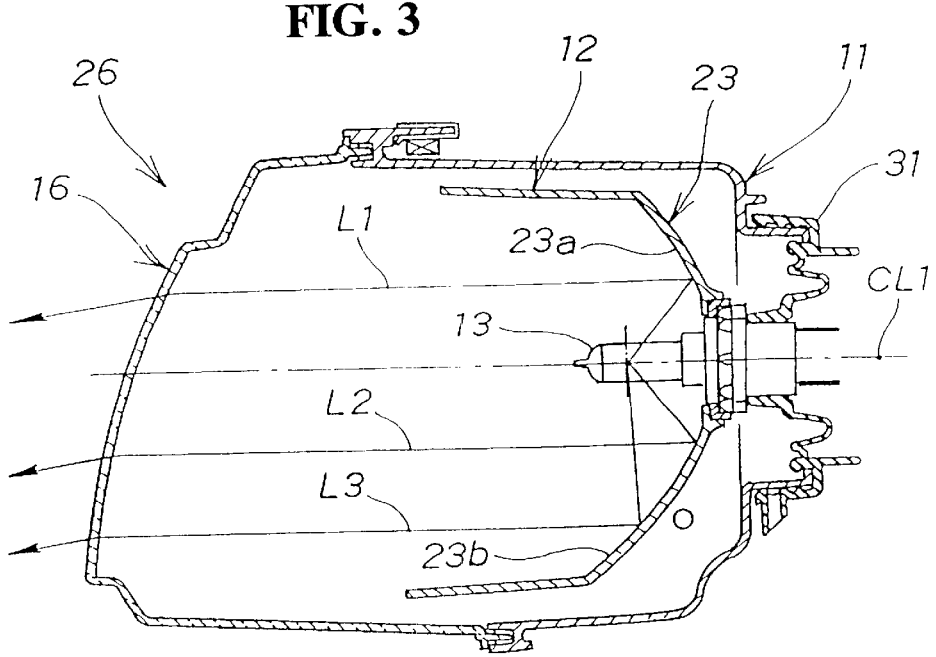
FIG. 3 is a cross section taken along the line 3—3 in FIG. 1.

FIG. 3 is a cross section taken along the line 3—3 in FIG. 1.

The low-beam lamp 26 is configured so that the light emitted from the low-beam bulb 13 is reflected by the low-beam reflecting portion 23 to obtain parallel rays of light, which are in turn refracted by the lens 16 to obtain a given light distribution of low beam.

Letting L1, L2, and L3 denote the typical rays of light emitted from the low-beam bulb 13, the ray L1 is reflected by an upper half portion 23a as the upper half of the low-beam reflecting portion 23, and then reaches the lens 16.

The rays L2 and L3 are reflected by a lower half portion 23b as the lower half of the low-beam reflecting portion 23, and then reaches the lens 16.

Accordingly, as compared with the case of using light reflected by only the half of a reflecting mirror, the low-beam lamp 26 has an advantage such that the light reflected by almost all of the low-beam reflecting portion 23 can be used, so that the brightness can be greatly increased without the need for increasing the rated power of the low-beam bulb 13.

Figure 4:
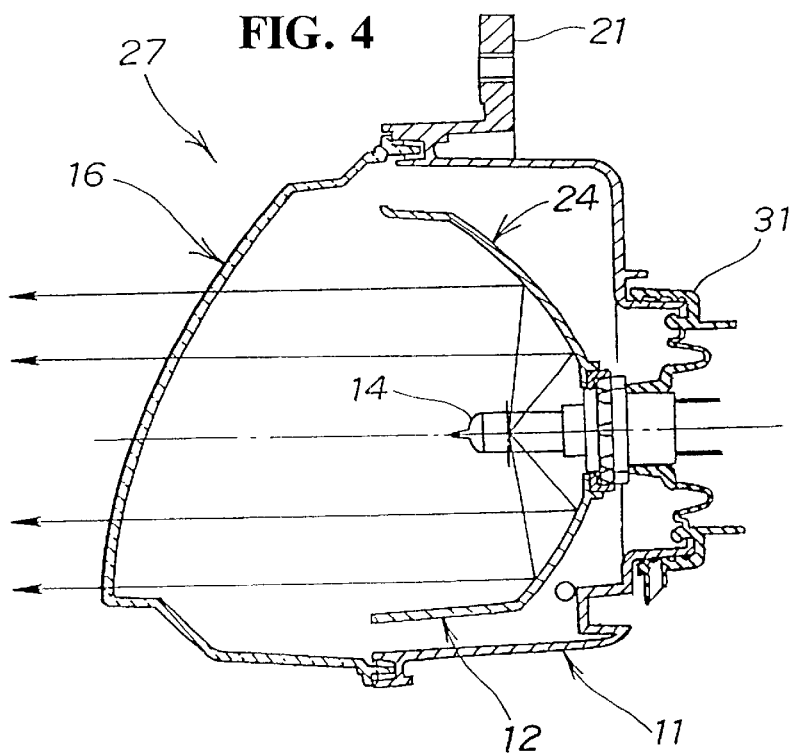
FIG. 4 is a cross section taken along the line 4—4 in FIG. 1.

FIG. 4 is a cross section taken along the line 4—4 in FIG. 1.

The left high-beam lamp 27 is configured so that the light emitted from the high-beam bulb 14 is reflected by the left high-beam reflecting portion 24 to obtain parallel rays of light, which are in turn refracted by the lens 16.

The light emitted from the high-beam bulb 14 is reflected by both the upper half and the lower half of the high-beam reflecting portion 24 to reach the lens 16.

The right high-beam lamp 28 shown in FIG. 2 is configured so that the light emitted from the high-beam bulb 15 is reflected by the right high-beam reflecting portion 25 to obtain parallel rays of light, which are in turn refracted by the lens 16.

The light emitted from the high-beam bulb 15 is reflected by both the upper half and the lower half of the high-beam reflecting portion 25 to reach the lens 16.

The light having reached the lens 16 in the left and right high-beam lamps 27 and 28 is refracted by the lens 16 to obtain a given light distribution of the high beam.

While the given light distributions of low beam and high beam are obtained by the lens 16 in this preferred embodiment, they may be obtained by forming the reflective surface of the reflector 12 into a multireflective surface.

As compared with such a headlight type that only one bulb is used to provide a low beam and a high beam, the headlight 10 using the low-beam lamp 26 dedicated to a low beam and the high-beam lamps 27 and 28 dedicated to a high beam has advantages such that the tuning for light distribution can be easily performed, that is, the cutting of the bulbs 13, 14, and 15 and the lens 16, the shaping of the reflector 12, etc. can be easily set, thereby reducing a manufacturing cost of the headlight 10.

Figure 5:
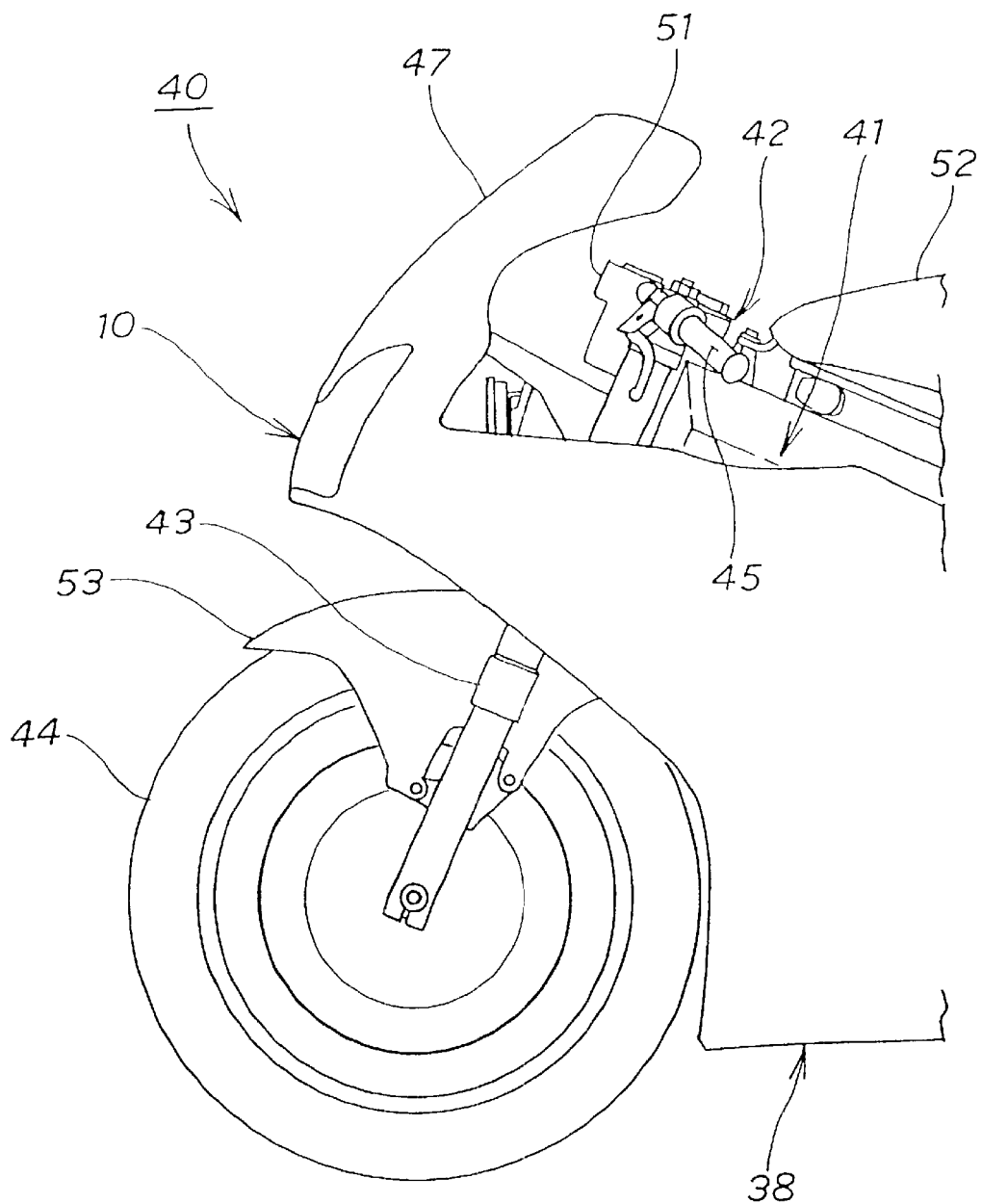
FIG. 5 is a side view of a front portion of a motorcycle having the headlight according to the present invention.

FIG. 5 is a side view of a front portion of a motorcycle 40 having the headlight 10 according to the present invention. The motorcycle 40 includes a body frame 41, a head pipe 42 provided at a front portion of the body frame 41, a front fork 43 and a front wheel 44 steerably mounted on the head pipe 42, a handle 45 mounted on an upper portion of the front fork 43, a cowling 38 mounted on the body frame 41, and the headlight 10 mounted on the cowling 38. The motorcycle 40 further includes a windscreen 47, a main switch 51, a fuel tank 52, and a front fender 53.

Thus, the headlight 10 is located at a front portion of the vehicle body.

Figure 6:
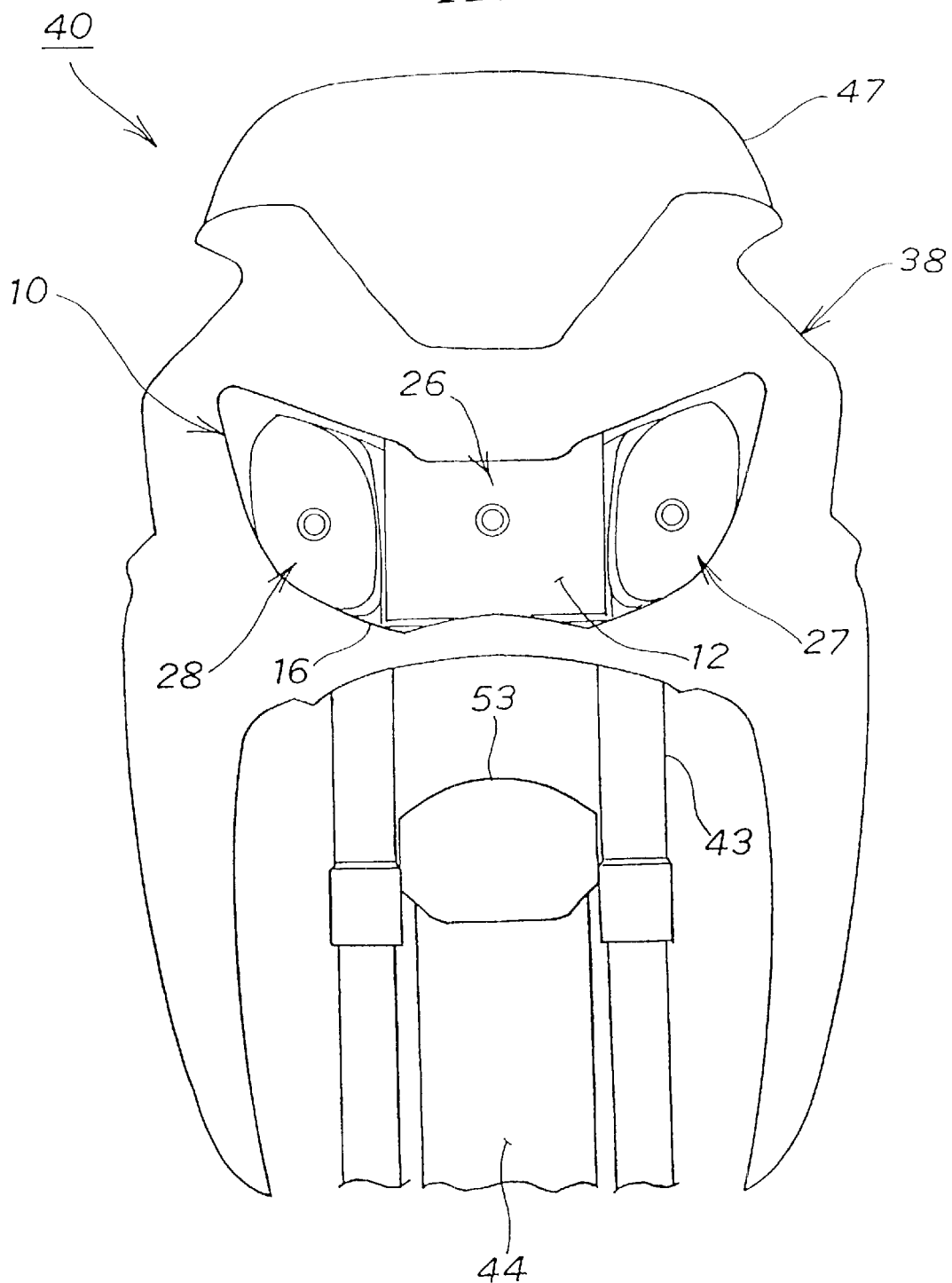
FIG. 6 is a front elevation of the motorcycle shown in FIG. 5.

FIG. 6 is a front elevation of the motorcycle 40 having the headlight 10 according to the present invention. As shown in FIG. 6, the headlight 10 is mounted on the cowling 38.

The left and right high-beam lamps 27 and 28 are provided on the left and right sides of the low-beam lamp 26. Accordingly, the area of the effective reflecting surface of the reflector 12 and the area of the effective lens surface of the lens 16 can be increased, thereby increasing the brightness of the high beam of the headlight 10 over the prior art.

Operations of the headlight 10 mentioned above will now be described.

Figure 7:
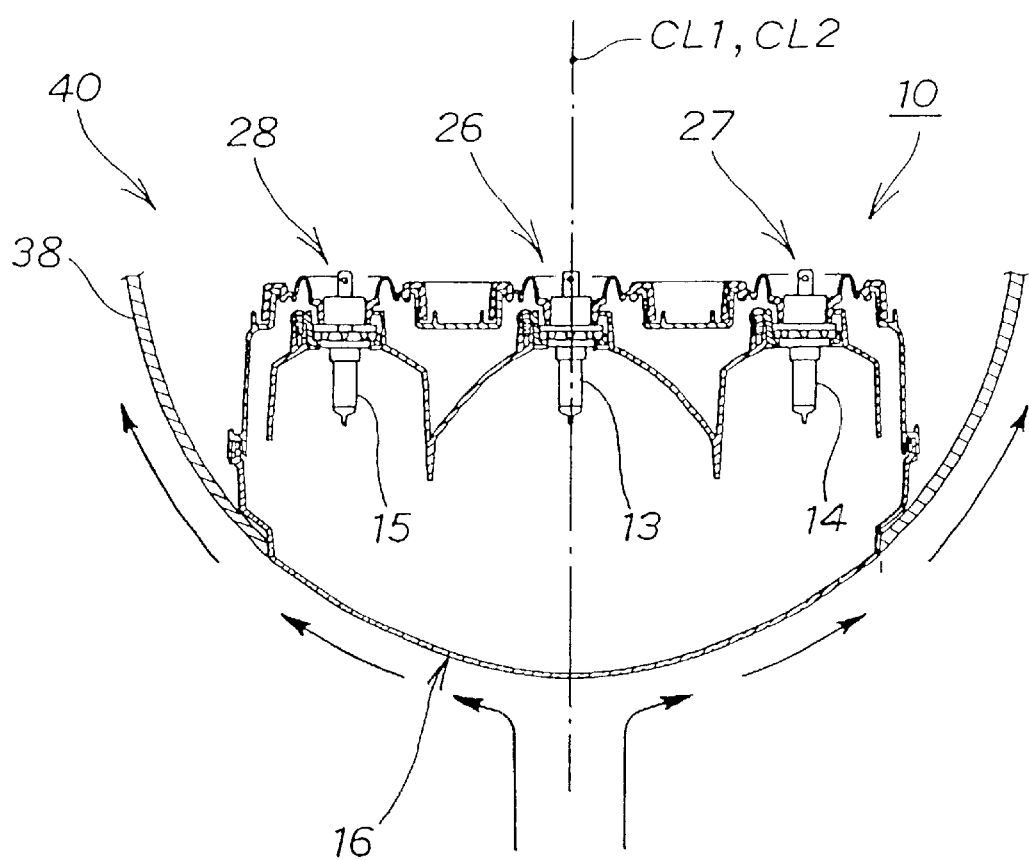
FIG. 7 is a horizontal sectional view for illustrating a first operation of the headlight according to the present invention.

FIG. 7 is a horizontal sectional view for illustrating a first operation of the headlight 10 included in the motorcycle 40. While the motorcycle 40 is being operated, air strikes against the lens 16 and flows along the outer surface of the lens 16 and the outer surface of the cowling 38 as shown by arrows in FIG. 7.

As previously mentioned with reference to FIG. 2, the relationship between the effective lens width W and the curvature height C is set so as to satisfy C/W≧0.2. In other words, the degree of curvature of the lens 16 relative to the width of the lens 16 is set larger than that of the conventional lens. Further, the outer surface of the lens 16 and the outer surface of the cowling 38 are smoothly joined together so as to form a flush surface. With this configuration, the shape of the lens 16 of the headlight 10 in combination with the cowling 38 can be made more streamlined as viewed in plan, so that the air flow along the outer surfaces of the lens 16 and the cowling 38 can be made smoother to thereby reduce the air resistance by the headlight 10 and the cowling 38.

If C/W<0.2 as in the prior art, the degree of curvature of the lens relative to the width of the lens is small, so that the outer surface of the lens becomes nearly flat, causing an increase in the air resistance.

As mentioned above with reference to FIG. 2, the left and right high-beam lamps 27 and 28 are arranged on the left and right sides of the low-beam lamp 26. Accordingly, the total reflection area of the left and right high-beam reflecting portions 24 and 25 of the left and right high-beam lamps 27 and 28 can be increased as compared with the case that only one high-beam lamp is provided. The lens 16 of the low-beam lamp 26 and the left and right high-beam lamps 27 and 28 is integrally formed and largely curved toward the front side of the vehicle body. Accordingly, although the area of the front surface of the headlight 10 is large, an increase in the air resistance can be suppressed.

As a result, the brightness of the headlight 10 can be increased without changing the rated powers of the bulbs 13, 14, and 15 of the low-beam lamp 26 and the left and right high-beam lamps 27 and 28.

FIGS. 8(*a*) to 8(*c*) are plan views for illustrating a second operation of the headlight 10 included in the motorcycle 40, in which various light distributions of the high beam on a road surface 57 during the operation of the motorcycle 40 are shown.

As shown in FIG. 8(*a*), the motorcycle 40 is being operated in a straight direction, and the road surface 57 is illuminated by a left light distribution 55 by the left high-beam lamp and a right light distribution 56 by the right high-beam lamp, thus obtaining a given light distribution of high beam on the road surface 57.

Reference character CL2 denotes a longitudinally extending center line of the motorcycle 40.

As shown in FIG. 8(*b*), the motorcycle 40 is cornering to the left. In this condition, the motorcycle 40 is inclined to the left, so that the left high-beam lamp becomes near to the road surface 57 and the right high-beam lamp becomes far from the road surface 57.

Accordingly, the illumination area of the left light distribution 55 by the left high-beam lamp on a left portion of the road surface 57 with respect to the center line CL2 is narrower than that during the straight running shown in FIG. 8(*a*).

Conversely, the illumination area of the right light distribution 56 by the right high-beam lamp on a right portion of the road surface 57 with respect to the center line CL2 is wider than that during the straight running shown in FIG. 8(*a*).

As shown in FIG. 8(*c*), the motorcycle 40 is cornering to the right. In this condition, the motorcycle 40 is inclined to the right, so that the left high-beam lamp becomes far from the road surface 57 and the right high-beam lamp becomes near to the road surface 57.

Accordingly, the circumstance in this case becomes opposite to that in the case of cornering to the left shown in FIG. 8(*b*). That is, the illumination area of the left light distribution 55 by the left high-beam lamp on a left portion of the road surface 57 with respect to the center line CL2 is wider than that during the straight running shown in FIG. 8(*a*). Conversely, the illumination area of the right light distribution 56 by the right high-beam lamp on a right portion of the road surface 57 with respect to the center line CL2 is narrower than that during straight operating conditions as shown in FIG. 8(*a*).

The high-beam lamps 27 and 28 (see FIG. 2) are symmetrically arranged on the left and right sides of the low-beam lamp 26 (see FIG. 2). Accordingly, in the case of cornering with the vehicle body being inclined as shown in FIG. 8(*b*) or 8(*c*), the illumination condition on the road surface 57 in the case of cornering to the left can be made similar to that in the case of cornering to the right, and the rider can therefore visibly recognize the road surface 57 with the same sense both in the case of cornering to the left and in the case of cornering to the right.

The following effects can be exhibited by the above configuration of the present invention.

The headlight according to the present invention comprises a low-beam lamp arranged on a longitudinally extending center line of a vehicle body and left and right high-beam lamps arranged on the opposite sides of the low-beam lamp as viewed in plan. With this configuration, the total reflection area of the reflecting portions of the left and right high-beam lamps can be increased. Preferably, the lens of the low-beam lamp and the left and right high-beam lamps is integrally formed and largely curved toward the front side of the vehicle body, so that the shape of the lens can be made nearly streamlined. Accordingly, although the area of the front surface of the headlight is large, an increase in the air resistance can be suppressed.

As a result, the brightness of the headlight can be increased without changing the rated powers of the bulbs of the low-beam lamp and the high-beam lamps.

Additionally, by symmetrically arranging the left and right high-beam lamps with respect to the low-beam lamp so as to be equally spaced therefrom, the illumination condition on the road surface by the high beam in the case of cornering to the left with the vehicle body inclined to the left can be made similar to that in the case of cornering to the right with the vehicle body inclined to the right.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A headlight arranged at a front portion of a vehicle body of a motorcycle, comprising:

a low-beam lamp arranged on a longitudinally extending center line of said vehicle body;

a left high-beam lamp arranged on a first side of said low-beam lamp as viewed in plan;

a right high-beam lamp arranged on a second side of said low-beam lamp as viewed in plan;

a lens positioned to cover said low-beam lamp, said left high-beam lamp, and said right high-beam lamp; wherein said left and right high-beam lamps are symmetrically arranged with respect to the low-beam lamp so as to be substantially equally spaced therefrom, such that the illumination condition on the road surface by a high-beam in the case of cornering to the left with the vehicle body inclined to the left can be made similar to that in the case of cornering to the right with the vehicle body inclined to the right.

2. The headlight arranged at a front portion of a vehicle body of a motorcycle according to claim 1, and further including a left high-beam lamp reflector positioned adjacent to a central low-beam lamp reflector, said central low-beam lamp reflector being positioned adjacent to a right high-beam lamp reflector for forming a reflective surface for projecting light onto a road surface.

3. The headlight arranged at a front portion of a vehicle body of a motorcycle according to claim 2, wherein the central low-beam lamp reflector has a predetermined radius of curvature that is larger relative to a radius of curvature of the left high-beam lamp reflector and the right high-beam lamp reflector.

4. The headlight arranged at a front portion of a vehicle body of a motorcycle according to claim 2, wherein said lens is curved to provide a streamlined surface.

5. The headlight arranged at a front portion of a vehicle body of a motorcycle according to claim 1, wherein said lens is curved and has an outer surface which is smoothly joined together with a cowling so as to provide a flush surface thus providing a streamlined outer surface.

6. The headlight arranged at a front portion of a vehicle body of a motorcycle according to claim 2, wherein said central low-bean lamp reflector is a parabolic shaped mirror for projecting light from said central low-beam lamp onto a road surface.

7. The headlight arranged at a front portion of a vehicle body of a motorcycle according to claim 6, and further including a lens positioned a predetermined distance relative to said central low-beam lamp reflector wherein light reflected by said parabolic shaped mirror provides parallel rays of light that project from said parabolic shaped mirror that are refracted by the lens to provide a predetermined distribution of low beam light.

8. The headlight arranged at a front portion of a vehicle body of a motorcycle according to claim 7, wherein light is reflected by an upper portion, a lower portion, a left side portion and a right side portion of said the parabolic shaped mirror of said central low-beam lamp reflector for increasing brightness of the reflected light without increasing a rated power of the low-beam lamp.

9. The headlight arranged at a front portion of a vehicle body of a motorcycle according to claim 2, wherein said left high-beam lamp reflector is a parabolic shaped mirror for projecting light from said left high-beam lamp onto a road surface.

10. The headlight arranged at a front portion of a vehicle body of a motorcycle according to claim 9, and further including a lens positioned a predetermined distance relative to said left high-beam lamp reflector wherein light reflected by said parabolic shaped mirror provides parallel rays of light that project from said parabolic shaped mirror that are refracted by the lens to provide a predetermined distribution of high beam light.

11. The headlight arranged at a front portion of a vehicle body of a motorcycle according to claim 10, wherein light is reflected by an upper portion, a lower portion, a left side portion and a right side portion of said the parabolic shaped mirror of said left high-beam lamp reflector for increasing brightness of the reflected light without increasing a rated power of the high-beam lamp.

12. The headlight arranged at a front portion of a vehicle body of a motorcycle according to claim 2, wherein said right high-beam lamp reflector is a parabolic shaped mirror for projecting light from said right high-beam lamp onto a road surface.

13. The headlight arranged at a front portion of a vehicle body of a motorcycle according to claim 12, and further including a lens positioned a predetermined distance relative to said right high-beam lamp reflector wherein light reflected by said parabolic shaped mirror provides parallel rays of light that project from said parabolic shaped mirror that are refracted by the lens to provide a predetermined distribution of high beam light.

14. The headlight arranged at a front portion of a vehicle body of a motorcycle according to claim 13, wherein light is reflected by an upper portion, a lower portion, a left side portion and a right side portion of said the parabolic shaped mirror of said right high-beam lamp reflector for increasing brightness of the reflected light without increasing a rated power of the high-beam lamp.

15. A headlight for a vehicle comprising:

a housing having a central portion, a left portion and a right portion;

a central low-beam lamp arranged in said central portion of said housing for providing a source of low-beam light;

a central reflector operatively positioned relative to said central low-beam lamp;

a left high-beam lamp arranged in said left portion of said housing for providing a source of high-beam light;

a left high-beam reflector operatively positioned relative to said left high-beam lamp;

a right high-beam lamp arranged in said right portion of said housing for providing a source of high-beam light; and a right high-beam reflector operatively positioned relative to said right high-beam lamp;

a lens positioned to cover said low-beam lamp, said left high-beam lamp, and said right high-beam lamp; wherein said central low-beam lamp utilizes the central low-beam reflector, said left high-beam lamp utilizes the left high-beam reflector and said right high-beam lamp utilizes the right high-beam reflector for increasing brightness of the reflected light without increasing a rated power of the central low-beam lamp, the left high-beam lamp and the right high-beam lamp; and said left and right high-beam lamps are symmetrically arranged with respect to the low-beam lamp so as to be substantially equally spaced therefrom, such that the illumination condition on the road surface by a high beam in the case of cornering to the left with the vehicle body inclined to the left can be made similar to that in the case of cornering to the right with the vehicle body inclined to the right.

16. The headlight for a vehicle according to claim 15, wherein the central low-beam lamp reflector has a predetermined radius of curvature that is larger relative to a radius of curvature of the left high-beam lamp reflector and the right high-beam lamp reflector.

17. The headlight for a vehicle according to claim 15, wherein said lens is curved to provide a streamlined surface.

18. The headlight for a vehicle according to claim 15, wherein said lens is curved and has an outer surface which is smoothly joined together with a cowling so as to provide a flush surface thus providing a streamlined outer surface.

19. The headlight for a vehicle according to claim 15, wherein said central low-beam lamp reflector is a parabolic shaped mirror for projecting light from said central low-beam lamp onto a road surface.

20. The headlight for a vehicle according to claim 19, and further including a lens positioned a predetermined distance relative to said central low-beam lamp reflector wherein light reflected by said parabolic shaped mirror provides parallel rays of light that project from said parabolic shaped mirror that are refracted by the lens to provide a predetermined distribution of low beam light.

21. The headlight for a vehicle according to claim 19, wherein light is reflected by an upper portion, a lower portion, a left side portion and a right side portion of said the parabolic shaped mirror of said central low-beam lamp reflector for increasing brightness of the reflected light without increasing a rated power of the low-beam lamp.

22. The headlight for a vehicle according to claim 15, wherein said left high-beam lamp reflector is a parabolic shaped mirror for projecting light from said left high-beam lamp onto a road surface.

23. The headlight for a vehicle according to claim 22, and further including a lens positioned a predetermined distance relative to said left high-beam lamp reflector wherein light reflected by said parabolic shaped mirror provides parallel rays of light that project from said parabolic shaped mirror that are refracted by the lens to provide a predetermined distribution of high beam light.

24. The headlight for a vehicle according to claim 22, wherein light is reflected by an upper portion, a lower portion, a left side portion and a right side portion of said the parabolic shaped mirror of said left high-beam lamp reflector for increasing brightness of the reflected light without increasing a rated power of the high-beam lamp.

25. The headlight for a vehicle according to claim 15, wherein said right high-beam lamp reflector is a parabolic shaped mirror for projecting light from said right high-beam lamp onto a road surface.

26. The headlight for a vehicle according to claim 25, and further including a lens positioned a predetermined distance relative to said right high-beam lamp reflector wherein light reflected by said parabolic shaped mirror provides parallel rays of light that project from said parabolic shaped mirror that are refracted by the lens to provide a predetermined distribution of high beam light.

27. The headlight for a vehicle according to claim 25, wherein light is reflected by an upper portion, a lower portion, a left side portion and a right side portion of said the parabolic shaped mirror of said right high-beam lamp reflector for increasing brightness of the reflected light without increasing a rated power of the high-beam lamp.

* * * * *